United States Patent [19]

Byers

[11] Patent Number: 5,570,417

[45] Date of Patent: Oct. 29, 1996

[54] SYSTEM FOR AUTOMATICALLY PROVIDING CUSTOMER ACCESS TO ALTERNATIVE TELEPHONY SERVICE PROVIDERS

[75] Inventor: Charles C. Byers, Aurora, Ill.

[73] Assignee: Lucent Technologies Inc., Murray Hill, N.J.

[21] Appl. No.: 412,248

[22] Filed: Mar. 28, 1995

[51] Int. Cl.$^6$ .............................. H04M 15/00; H04M 7/00
[52] U.S. Cl. ............................ 379/115; 379/114; 379/121; 379/220; 379/221
[58] Field of Search ...................................... 379/112, 113, 379/114, 115, 121, 133, 134, 207, 219, 220, 221

[56] References Cited

U.S. PATENT DOCUMENTS

| | | | |
|---|---|---|---|
| 5,289,536 | 2/1994 | Hokari | 379/221 |
| 5,337,352 | 8/1994 | Kobayashi et al. | 379/234 |
| 5,452,351 | 9/1995 | Yamamoto | 379/115 |
| 5,473,630 | 12/1995 | Penzias et al. | 379/114 |

Primary Examiner—Krista M. Zele
Assistant Examiner—Daniel S. Hunter
Attorney, Agent, or Firm—Dennis J. Williamson

[57] ABSTRACT

A telecommunications network including a plurality of local exchanges or switching systems, each local switch supporting at least one customer line accessed by customer premise equipment (CPE) such as telephone station sets or multimedia stations. The local switches are connected to one another directly and through tandem switches to create the network. A data base is associated with each local exchange, or with a limited number of local exchanges, and is accessed by the local exchange to provide information for controlling the routing of a call. Each data base contains rate information for the service providers offering competitive services. Such rate information includes the service providers' basic rate structures, time of day discounts, group calling plans, usage discounts and the like. The switching system, in response to information provided by the data base, automatically routes the call to the lowest cost service provider based on this rate information. The data base is updated to reflect changes in service provider rates and to record calls made by each customer for purposes of tracking quantity calling discounts or the like and to update the rate information.

20 Claims, 3 Drawing Sheets

5,570,417

SYSTEM FOR AUTOMATICALLY PROVIDING CUSTOMER ACCESS TO ALTERNATIVE TELEPHONY SERVICE PROVIDERS

Technical Field

This invention relates, generally, to customer access to competitive telephony service providers and, more particularly, to a system for automatically switching a customer to the least expensive service provider for a particular call.

BACKGROUND OF THE INVENTION

As will be appreciated, telephony customers in the United States presently can choose from a number of long distance service providers or carriers each offering various subscription services and rate packages. Moreover, a rate package from even a single service provider can result in different rates for different calls depending on the time of day, customer usage, the identity of the person called and/or other factors, such as promotional offers. As a result, the customer's decision as to which carder to use is a complicated one and will not necessarily result in the lowest cost service for all long distance calls. It is also likely that, in the relatively near future, local service will be provided by a number of competing entities such that the customer will have the same choices in selecting local service that now exist for long distance service. Such open competition will only increase the complexity of selecting service carriers.

In response to this problem, a personal data base maintained on the customer's personal computer for use with the customer's premise equipment such as a telephone or multimedia station has been developed that includes rate information for various long distance providers. The customer can search the data base in an attempt to identify the lowest cost carrier for a particular call. One problem with such a system is that each customer must import and maintain his or her own personal data base. Such a system is expensive and is clearly not feasible for all telephony customers. Moreover, the user must somehow gather rate information and load this information into the data base. Even for those customers who have the capability of establishing such a data base, the continual maintenance and updating of such a system is time consuming and cumbersome because the service providers' rate packages and subscriber plans change frequently.

Therefore, a problem in the art is that there is no simple and cost-effective system for routing any customer to the least expensive service for a particular call.

SUMMARY OF THE INVENTION

This problem is solved and a technical advance in the art is achieved by the switch based call routing system of the present invention. The system of the invention operates in a telecommunications network including a plurality of local switches or exchanges where each local switch supports customer lines accessed by customer premise equipment (CPE) such as telephone station sets or multimedia stations. The local switches are connected to one another directly and through tandem switches to create the telephone network as will be understood by one skilled in the art. In the preferred form of the invention, a data base is associated with each local exchange, or with a limited number of local exchanges, and is accessed by the local exchange to provide information for controlling the routing of calls of many, if not all, of the customers sewed by the exchange. Each data base contains rate information for the service providers offering competitive services. Such rate information includes the service providers' basic rate structures, time of day discounts, group calling plans, usage discounts and the like. In the preferred system, customers subscribe to the service thereby allowing access to the data base for all outgoing calls made by the subscribing customer. The switching system, in response to information provided by the data base, automatically routes the call through a selected service provider. The data base is routinely updated to maintain the current rate structures of the service providers and to record the calls made by each customer for purposes of tracking quantity calling discounts or the like. Thus, the customer can be guaranteed of getting the least expensive service for every call.

DETAILED DESCRIPTION

Figure 1:
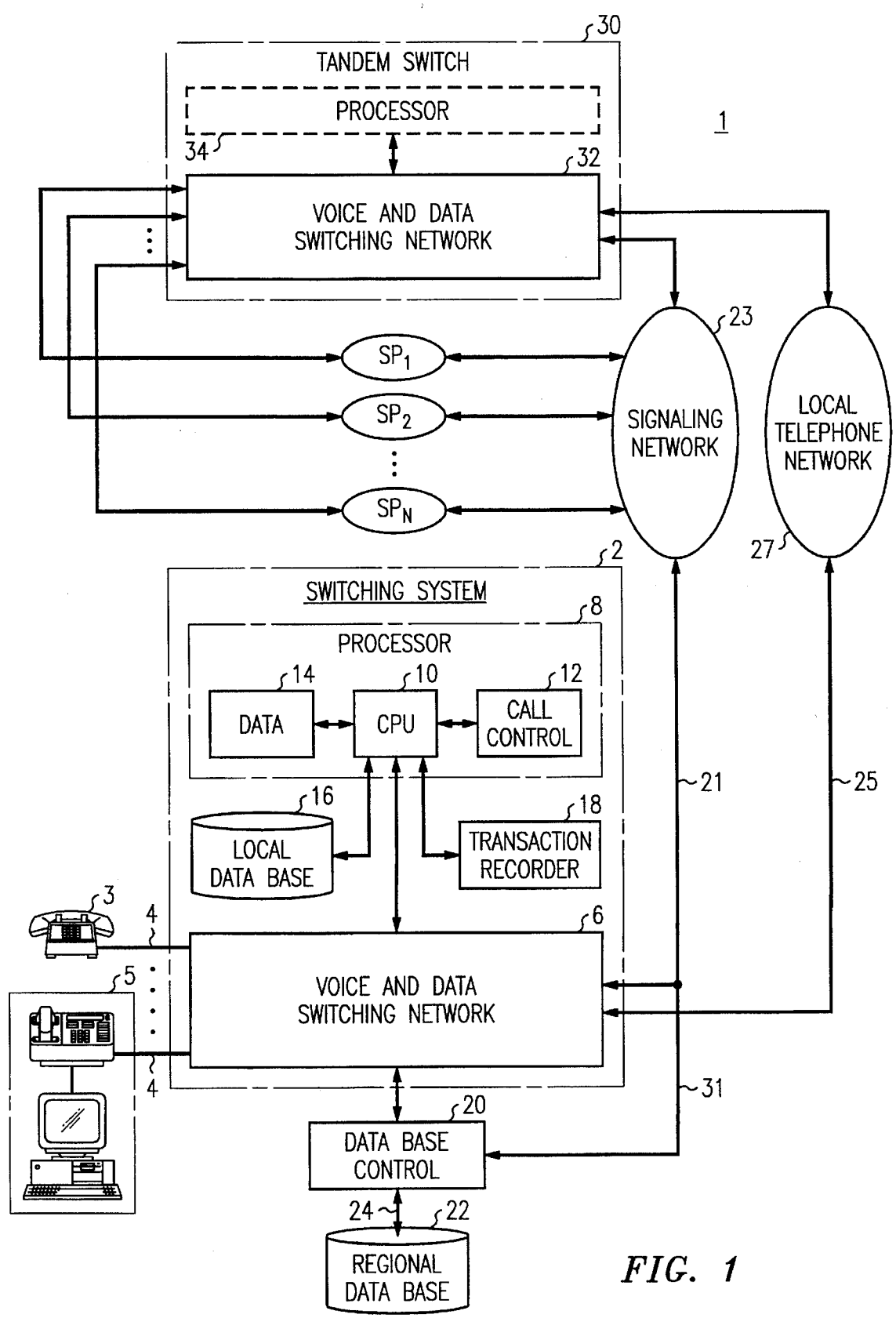
FIG. 1 is a block diagram of the telecommunications network in which the present invention operates.

FIG. 1 is an architectural block diagram illustrating the operation of the invention. FIG. 1 shows a telecommunications network 1 including a local exchange or switching system 2. Switching system 2 can be a 5ESS® switch, described in AT&T Technical Journal, Vol. 64, No. 6, part 2, pp. 1305–1564, July/August 1985, and manufactured by AT&T. Other suitable switches or switching systems can also be used as will be understood by one skilled in the art.

A plurality of CPEs, such as telephone station set 3 or multimedia station 5, are connected to switching system 1 over customer lines 4. The customer lines 4 can include analog lines, Integrated Services Digital Network (ISDN) lines, coaxial cable or other access loop technologies, switching system 2 having the capabilities for dealing with these technologies. Accordingly, switch 2 may be an ISDN switching system such as the system disclosed in U.S. Pat. No. 4,592,048 issued to Beckner et al. on May 27, 1986.

The switching system 2 comprises a processor 8 for controlling the switch. The processor 8, in turn, comprises a central processing unit (CPU) 10, a call control 12 storing a call control program for controlling the operations of the central processing unit, and call data 14. Switching system 2 also includes a local data base 16 for storing data such as: 1) customer lines connected to the system, such as a Q.931 equipped customer line, 2) interconnecting networks, 3) data links, and 4) data about the data base control. CPU 10 accesses the local data base 16 for supplying data for display at CPEs connected to switching system 2 and/or for supplying data in response to requests received from signaling network 23. Signaling network 23 can consist of a CCS7 signaling network. CPU 10 controls a transaction recorder 18 for recording billing information associated with services provided in accordance with the invention. Voice and data switching network 6, under control of the CPU 10, transmits data among processor 8 and regional data base control 20, and transmits voice and data among data links coming into the system such as the data link 21 to the signaling network 23, data link 25 to the local telephone network 27 of the public switched telephone network and customer lines 4. Regional data base 22 is connected to the data base control 20 via data link 24 such that data in the regional data base can be accessed by processor 8.

In the typical arrangement of FIG. 1, the location at which the calls are connected with the long distance service providers is in a tandem switch. As will be appreciated, a tandem switch links local exchanges such as switching system 2 to one another and to other tandem switches. As illustrated in FIG. 1, switch 30 represents a tandem switch in which voice and data switching network 32 routes calls received from the local telephone network 27 and routes those calls to one of the alternative long distance service providers $SP_1, SP_2 \ldots SP_N$. Like switching system 2, switch 30 includes voice and data switching network 32 that is controlled by a processor 34 and can include data bases and/or transaction recorders (not shown). Moreover, the voice and data switching network 32 is connected to and forms a pan of the local telephone network 27 and the signaling network 23. While in the exemplary arrangement the connection to the long distance service providers is at the tandem switch 30, it will be appreciated that connection to the long distance service providers can also be made at the local exchange or switching system 2. It is immaterial for purposes of this invention whether the long distance service providers are accessed at the local exchange, at a tandem switch or elsewhere in the network. Further, while in the illustrated embodiment, switch 30 is described as a tandem switch, it will be appreciated that switch 30 could constitute another local exchange or an inter-network switch.

Figure 2:
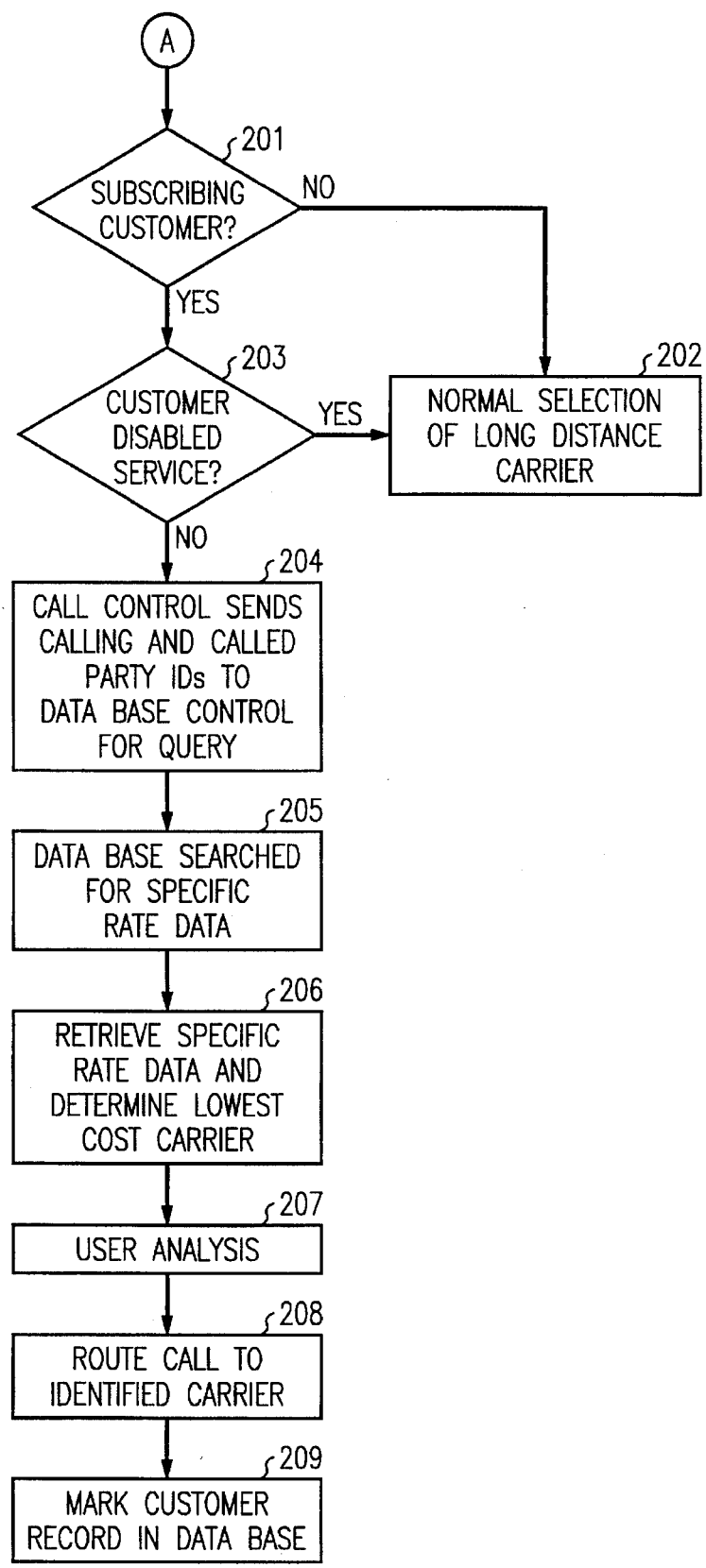
FIG. 2 is a flow diagram of the method for operating the system of the invention.

The change required in the switching system 2 to implement the present invention is the addition of a program in the CPU 10 for executing the tasks described in the flow chart of FIG. 2. The information supplied to the CPU 20 for executing the program may come from the local data base 16 or from the regional data base 22 where the regional data base is accessed by a limited number of local switches located in that region. It is to be understood that a centralized data base could be used for storing this data; however, the use of the local or regional data bases speeds call set up time. The data base contains information about the rate structures of the service providers $SP_1 \ldots SP_N$ and provides this data to the switching system 2 when requested.

Specifically, the data base contains the general rate structure for each long distance carrier that can be accessed via the network to carry calls made from the switching system associated with that data base. In addition to the general rate structure, the data base includes a table of rate variations based on the time of day at which the call is made to account for discounts provided by most service providers for off-peak calls. In this regard, CPU 20 is provided with a real time clock to identify the time of the call. The data base also includes special promotions and subscriber plan information such as discounts for calls to selected numbers in a predesignated group of numbers or the like. It will be appreciated that such customer information must be maintained in a confidential manner such that access to this information is limited to entities entitled to such access. Finally, the data base maintains a running tally for all calls made by a customer during a billing cycle (i.e., monthly). In this manner, when an individual customer reaches a predetermined call quantity on a particular carder that triggers discounts, the system of the invention can take advantage of those discounts.

It is also possible to split up the rate information between local data base 16 and regional data base 22. For example, local data base 16 could include information relevant to the customers served by switching system 2 such as the calling and/or called party information and the subscriber information. Regional data base 22 could include information common to all customers such as general rate structures, time of day discounts, promotions or the like. It will be appreciated that all of the rate information can be stored in either local data base 16 or regional data base 22, if desired. In any event, CPU 20 will access the data base containing the relevant information and retrieve the specific information required for the particular call.

In addition to the above-mentioned information, the data base is intended to maintain data on any rate structure and is updated routinely to incorporate such information, as will be appreciated by one skilled in the art. In the preferred form of the invention, the data base of the invention is updated automatically when revised rate information is input into the system for billing purposes. For example, the data base containing the rate information for operating the system of the invention, such as regional data base 22 is connected to the signaling network 23 by data link 31. When a long distance service provider updates its rate information in the network, the new information is delivered to the regional data bases through the signaling network 23. Other methods for updating the rate information in the data base via the network can also be used as will be understood by one skilled in the art. Unlike the prior art, the switch based data base is maintained current even for short lived special promotions that would otherwise be impossible to maintain on a customer's personal data base.

The operation of the system will now be described with reference to the flow diagram of FIG. 2. Upon receipt of a long distance call at switching system 2 (FIG. 1), the CPU determines if the calling station or customer is entitled to access to the service of the invention (block 201 ). For purposes of this description, calling station includes any originating CPE served by switching system 2. For example, if service is available only to customers who presubscribe, the CPU determines if the calling station or the personal identification number of the calling customer identify a presubscriber. If the customer does not presubscribe, long distance service is selected in the normal manner (block 202). If desired, all customers on a local exchange could automatically be entitled to the service in which case the step of block 201 could be eliminated for any calls made from a CPE in that local exchange. It is also possible to include some processing functions in, for example, data base control 20 such that the data base control can make some determinations such as customer access to the service of the invention without the need to transmit data from the data base to the CPU.

If the customer does presubscribe, the CPU then determines if the customer has disabled the service (block 203). In a preferred embodiment, the customer is given the ability to disable the service for any particular call even though the customer subscribes to the service. By entering a numeric code before dialing the called number, the customer may disable the service and is allowed to choose a desired service provider regardless of its relative cost. If the service is disabled, the long distance carrier is chosen by the customer in the normal manner (block 202). Alternatively, the customer may not be given the option of disabling the service, with the result that all calls made by that customer would automatically be routed to the system selected service provider.

If the calling customer subscribes to the service and the service is not disabled, the specific rate information relevant to the call (including calling and called party information) is retrieved from either the local or regional data base, depending on where the information is stored (block 204). CPU searches the retrieved rate information for the lowest cost service provider by looking up the basic rate structure of each service provider, determining if a time of day discount applies and determining, based on the called and calling party information, if a quantity discount applies, if the called party is a member of the calling party's designated group, if a special promotion is applicable or any other relevant selection criteria (block 205). It should be noted that not all customers are members of a designated group or are entitled to quantity discounts or special promotions, therefore, before these searches are executed, a preliminary check can be made to determine if the subscribing customer is entitled to such discounts. As previously described, this preliminary check can be made in data base control 20 rather than CPU 10, if desired. Based on these searches, the lowest cost carrier for the call is determined. Once the specific rate data is located, it is retrieved and the CPU determines the lowest cost carrier (block 206).

Before routing the call to the lowest cost carrier, a user analysis could be made, if desired (block 207). The user analysis is intended to prevent routing to a lowest cost carrier where such routing otherwise would be undesirable for the customer. For example, if a call is made near the end of a billing cycle and the lowest cost carrier has not yet been used during the billing cycle (and the rate differential is minimal), the call is routed to the slightly more expensive carrier to avoid sending the customer an additional bill. Other user analyses could also be made. For example, subscribers may choose not to be connected to a particular carrier or a limit could be made on the number of different carriers a customer is connected to during a billing cycle. Alternatively, some of these decisions could be made as part of the initial search process. Further, if two carriers have the same cost for a particular call, a predesignated customer preferred carrier would be selected. It will be appreciated that the user analysis could be eliminated and the customer could always be routed to a lowest cost career.

Once the final carrier is determined, the call is routed to that carrier in the known manner (block 208) by switching network 6 in accordance with routing instructions provided by CPU 10. A record of the call is made for billing purposes and the appropriate data base is updated to record the last call on the calling customer's record for purposes of quantity discounts and the like (block 209).

A similar system can be used to automatically route local calls to a low cost carrier where competitive local services are available. In the simplest scenario, all calls within a local exchange are non-competitively routed to a single carrier. For local calls outside of the service area of that exchange, a call could be routed to any of the competing local carriers. Referring to FIG. 1, for example, any calls with a destination outside the service area of switching system 2 would be eligible for routing to one of several competing local carriers. A single carrier would carry all calls between CPEs served by switching system 2.

Figure 3:
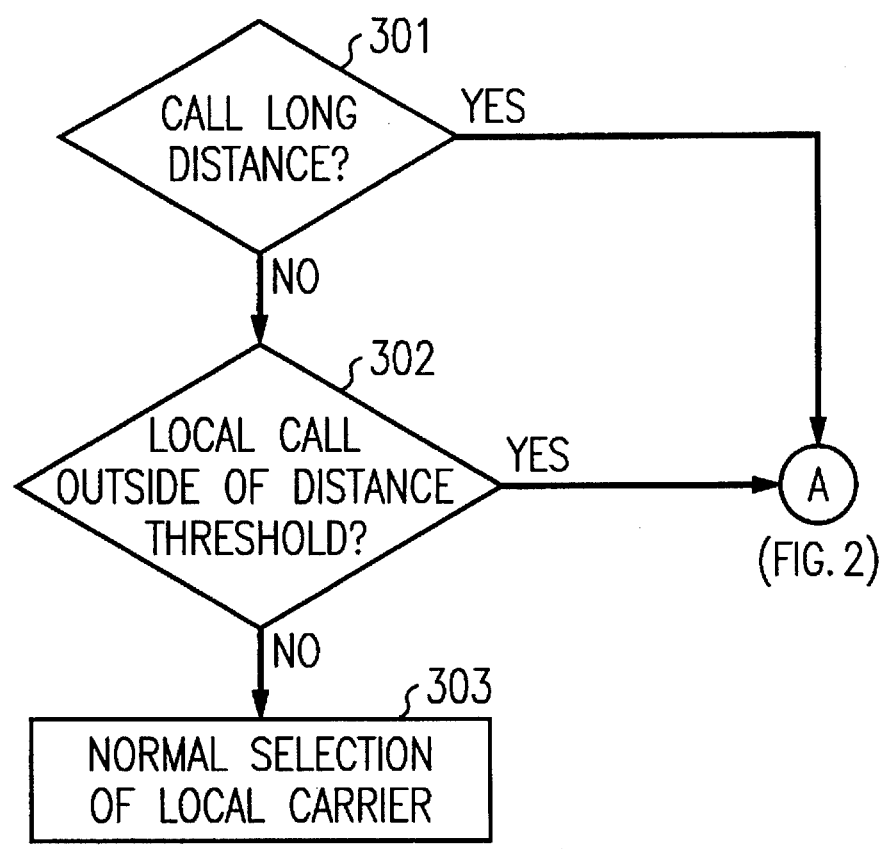
FIG. 3 is a flow diagram of an alternate method for operating the systems of the invention.

To implement such a system, an additional plateau is incorporated in the operation of the system of the invention. Referring to FIGS. 2 and 3, for a call made from a CPE served by switching system 2 to a CPE served by a different switching system, CPU 20 first determines if the call is local or long distance (block 301). If it is long distance, the operation described with respect to FIG. 2 occurs. If it is a local call, the CPU determines if the destination is far enough away from the switching system 2 to warrant a search for the lowest cost carrier (block 302). The threshold distance at which the service of the invention is implemented is somewhat arbitrary; however, use of a threshold level will eliminate searching alternate carriers where there is little or no economic justification for making the search. Once it is determined that the call is outside of the threshold distance, the search process proceeds as previously described with reference to FIG. 2 except that the data base, or a portion of the data base, is searched for local rather than long distance service providers. If the call is not outside the threshold distance, selection of the local carrier occurs in the normal manner (block 303).

Eventually there may exist competition for local service, even within a local exchange. In such a situation, the switching system 2 will be physically divided among a number of competitive carriers where access to any carrier on the exchange will be controlled in the same manner as access to long distance carriers. The routing system of the invention is equally applicable to such a situation and access to the local carrier can be decided as described with reference to FIGS. 2 and 3 except that access to the selected local carrier occurs within switching system 2 such as by using data in local data base 16.

While the invention has been described in detail with respect to the attached figures, it is will be appreciated that numerous changes and modifications can be made in the system without departing from the scope of the invention.

The invention claimed is:

1. In a telecommunications network having at least one switching system connected to a plurality of calling stations, a method of automatically routing a call from one of the plurality of calling stations to a selected one of a plurality of service providers accessible from the switching system, said selected service provider offering the lowest cost service for carrying the call, comprising the steps of:

storing in a data base rate information regarding said plurality of service providers and said plurality of calling stations, said data base being associated with said switching system such that it is accessible by all calling stations;

receiving the call in said switching system;

before accessing the data base, determining if accessing the data base is economically justified for the call;

accessing said data base responsive to receiving the call;

retrieving from said data specific rate information associated with said call;

determining the selected one of said plurality of service providers based on said specific rate information; and routing the call through said selected one of said service provider.

2. The method according to claim 1, wherein the rate information includes the basic rate structures for the plurality of service providers.

3. The method according to claim 1, wherein the rate information includes time-of-day discounts.

4. The method according to claim 1, wherein the rate information includes special discounts available to a calling party.

5. The method according to claim 1, further including the preliminary step of determining if the data base is to be accessed for the call.

6. The method according to claim 1, wherein before routing the call, determining if the call should not be routed to the selected one of said service providers.

7. The method according to claim 1, wherein the step of determining if accessing the data base is economically justified includes the step of determining the distance of the call.

8. The method according to claim 1, wherein the data base is a local data base in the switching system and said step of accessing includes the step of accessing the local data base.

9. The method according to claim 1, wherein the data base is a regional data base serving a region of the network and said step of accessing includes using a data link to access said regional data base.

10. The method of claim 1, further including the step of updating the data base with information regarding the call made by the calling party.

11. The method of claim 1 further including the step of updating the data base with revised rate information supplied by the service providers.

12. A telecommunications network including a switching system connected to a plurality of calling stations, said switching system receiving a call made by a calling party from one of the plurality of calling stations and routing said call to a selected one of a plurality of service providers accessible from the switching system, said selected one of a plurality of service providers offering the lowest cost service for carrying the call, comprising:

a data base for storing rate information on said plurality of service providers and said plurality of calling stations, said data base being associated with said switching system such that it is accessible by said plurality of calling stations;

means for receiving a call in said switching system;

means for preliminarily determining if accessing the data base is economically justified;

means for accessing said data base responsive to receiving said call;

means for retrieving from said data base, specific rate information associated with said call;

means for determining the selected one of said plurality of service providers based on said specific rate information; and means for routing the call through said selected one of said service provider.

13. The apparatus according to claim 12, wherein the rate information includes the basic rate structure of the service providers.

14. The apparatus according to claim 12, wherein the rate structure includes time-of-day discounts.

15. The apparatus according to claim 12, wherein the rate information includes special discounts available to the calling party.

16. The apparatus according to claim 12, further including means for determining if the call should not be routed to the selected one of said service providers.

17. The apparatus according to claim 12, wherein the data base is in the switching system.

18. The apparatus according to claim 12, wherein the data base serves a region of the network including said switching system.

19. The apparatus of claim 12, further including means for updating the data base with information regarding the calling party.

20. The method of claim 12, further including means for updating the data base with information regarding the rate information of said service providers, wherein the rate information is input to said data base through the network.

* * * * *